United States Patent
Yelton (10) Patent No.: US 11,536,843 B2
(45) Date of Patent: Dec. 27, 2022

(54) DE-JITTER OF POINT CLOUD DATA FOR TARGET RECOGNITION

(71) Applicant: The Boeing Company, Chicago, IL (US)

(72) Inventor: Dennis J. Yelton, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 375 days.

(21) Appl. No.: 16/785,572

(22) Filed: Feb. 8, 2020

(65) Prior Publication Data

US 2021/0247517 A1   Aug. 12, 2021

(51) Int. Cl.
*G01S 17/894* (2020.01)
*G01S 17/10* (2020.01)
*G01S 7/48* (2006.01)
*G06V 20/64* (2022.01)

(52) U.S. Cl.
CPC .......... *G01S 17/894* (2020.01); *G01S 7/4808* (2013.01); *G01S 17/10* (2013.01); *G06V 20/653* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 6,731,283 B1 | 5/2004 | Navab | |
| 7,616,817 B2 | 11/2009 | Hilde | |
| 9,128,185 B2 | 9/2015 | Zeng | |
| 9,128,188 B1 | 9/2015 | Hilde | |
| 9,329,269 B2 | 5/2016 | Zeng | |
| 9,606,233 B2 | 3/2017 | Sebastian et al. | |
| 9,804,597 B1 | 10/2017 | Ferguson et al. | |
| 9,983,309 B2 | 5/2018 | Sebastian et al. | |
| 10,969,489 B2* | 4/2021 | Schmitt | G01S 17/89 |
| 11,073,597 B2* | 7/2021 | Vuletici | G01S 7/003 |
| 2010/0166294 A1* | 7/2010 | Marrion | G06V 10/757 |
| | | | 382/154 |
| 2013/0237811 A1* | 9/2013 | Mihailescu | A61B 8/5269 |
| | | | 600/407 |
| 2013/0271461 A1* | 10/2013 | Baker | G06T 15/50 |
| | | | 345/420 |
| 2018/0113200 A1* | 4/2018 | Steinberg | G01S 7/4814 |
| 2019/0370614 A1 | 12/2019 | Crouch et al. | |
| 2020/0211293 A1* | 7/2020 | Kim | G01S 17/894 |
| 2020/0226824 A1* | 7/2020 | Lee | H04N 13/261 |
| 2021/0033706 A1* | 2/2021 | Funaya | G01S 7/4808 |

(Continued)

OTHER PUBLICATIONS

European Search Report; Application EP21154961.
Walter Armbruster; Maritime Target Identification in Flash-ladar Imagery; May 11, 2012.

*Primary Examiner* — Reza Aghevli
(74) *Attorney, Agent, or Firm* — Duft & Bornsen, PC (57) ABSTRACT

Jitter is removed from point cloud data of a target by fitting the data to 3-D models of possible targets. The point cloud data is de-jittered as a group by shifting the point cloud data in its coordinate system until a minimum fit error is observed between the shifted data and a 3-D model under analysis. Different 3-D models may be evaluated in succession until a 3-D model is identified that has the least fit error. The 3-D model with the least fit error most likely represents the identity of the target.

21 Claims, 7 Drawing Sheets

(56) References Cited

U.S. PATENT DOCUMENTS

2021/0166426 A1\* 6/2021 Mccormac .............. G06T 7/579
2021/0247517 A1\* 8/2021 Yelton .................... G06V 20/64
2021/0287331 A1\* 9/2021 Kwon ................... G06T 3/0068

\* cited by examiner

DE-JITTER OF POINT CLOUD DATA FOR TARGET RECOGNITION

FIELD

This disclosure relates to the field of laser imaging, and in particular, to mitigating jitter in point cloud data to improve a target recognition process.

BACKGROUND

Lidar (light detection and ranging) is a process that measures distances to a target by illuminating the target with laser light and measuring the reflected light with one or more sensors. Differences in the laser return times and/or wavelengths can then be used to make a digital 3-D representation of the target. Different types of lidar systems exist, including scanning lidar systems and flash lidar systems. Scanning lidar systems utilizes scanning optics with a laser to scan a target, while flash lidar systems diffuses the laser to illuminate the target with a single flash of light. In flash lidar systems, a grid of tiny sensors (e.g., planar photon detectors organized in rows and columns) captures the reflected light from the target.

Flash lidar operates similarly to a 2-D digital camera, with rows and columns of pixel sensors that have the additional capability of generating range information based on the time-of-flight of the illuminating laser pulse. The azimuth and elevation of the returning pulse can also be determined based on the orientation of the laser source with respect to the photon sensors. This type of information (e.g., angle-angle-range data) can be used to generate point cloud data in a 3-D coordinate system, which represents information about the surface of the target being illuminated.

While the point cloud data represents information about the target, jitter in the point cloud data represents errors in the underlying data that may make target recognition more difficult. Jitter occurs due to the relative motion of the various components in a flash lidar system with respect to the target or with respect to each other, such as the laser source and the detector array. Thus, jitter is one form of inaccuracy in the point cloud data that could be improved in order to improve the accuracy of a target recognition process.

SUMMARY

In the embodiments described in the present disclosure, jitter is removed from point cloud data of a target by fitting the data to 3-D models of possible targets. The point cloud data is de-jittered as a group by shifting the point cloud data in its coordinate system until a minimum fit error is observed between the shifted data and a 3-D model under analysis. Different 3-D models may be evaluated in succession until a 3-D model is identified that has the least fit error. The 3-D model with the least fit error most likely represents the identity of the target.

One embodiment comprises a method of identifying an unknown target. The method comprises (a) generating lidar point cloud data of a target, (b) selecting a 3-D model from a plurality of 3-D models of possible targets, (c) mapping the selected 3-D model into a spatial coordinate system of the lidar point cloud data, and (d) calculating a fit error between the lidar point cloud data and the selected 3-D model. The method further comprises (e) repetitively shifting the lidar point cloud data as a group in the spatial coordinate system and re-calculating the fit error until a minimum fit error for the selected 3-D model is identified, and (f) repeating steps b-e for different 3-D models of the plurality of 3-D models. The method further comprises (g) identifying the 3-D model having the least fit error, and (h) identifying the target based on the 3-D model having the least fit error.

In an embodiment of the method of identifying the unknown target, (a) generating lidar point cloud data comprises generating flash lidar point cloud data.

In an embodiment of the method of identifying the unknown target, the target comprises an aircraft.

In an embodiment of the method of identifying the unknown target, (c) mapping the selected 3-D model comprises scaling the 3-D model in the spatial coordinate system of the lidar point cloud data based on a range of the target.

In an embodiment of the method of identifying the unknown target, (c) mapping the selected 3-D model comprises orienting the 3-D model in the spatial coordinate system of the lidar point cloud data based on a velocity vector of the target.

In an embodiment of the method of identifying the unknown target, (e) repetitively shifting the lidar point cloud data comprises integer shifts in the spatial coordinate system that are based on quantized spatial characteristics of the lidar point cloud data.

In an embodiment of the method of identifying the unknown target, (d) calculating the fit error between the lidar point cloud data and the selected 3-D model comprises calculating a Root Mean Square goodness-of-fit.

Another embodiment comprises another method of identifying an unknown target. The other method comprises storing a plurality of 3-D models of possible targets, and generating point cloud data of an unidentified target by ranging the unidentified target with a flash ranging device. For each 3-D model, performing the steps of mapping the 3-D model into a spatial coordinate system of the point cloud data, calculating a fit error between the point cloud data and the 3-D model, and repetitively shifting the point cloud data as a group in the spatial coordinate system and re-calculating the fit error until a minimum fit error for the 3-D model is identified. The other method further comprises identifying the 3-D model having the least fit error, and identifying the unidentified target based on the 3-D model having the least fit error.

In an embodiment of the other method of identifying the unknown target, the flash ranging device comprises flash lidar.

In an embodiment of the other method of identifying the unknown target, the unidentified target comprises an aircraft.

In an embodiment of the other method of identifying the unknown target, mapping the 3-D model comprises scaling the 3-D model in the spatial coordinate system of the lidar point cloud data based on a range to the unidentified target.

In an embodiment of the other method of identifying the unknown target, mapping the 3-D model comprises orienting the 3-D model in the spatial coordinate system of the lidar point cloud data based on a velocity vector of the unknown target.

In an embodiment of the method of identifying the unknown target, repetitively shifting the lidar point cloud data comprises integer shifts in the spatial coordinate system that are based on quantized spatial characteristics of the lidar point cloud data.

In an embodiment of the other method of identifying the unknown target, calculating the fit error between the lidar point cloud data and the 3-D model comprises calculating a Root Mean Square goodness-of-fit.

Another embodiment comprises a flash lidar system comprising a laser, a transmitter, a memory, and a processor. The laser generates laser light. The transmitter illuminates a target with one or more pulses of the laser light. The receiver detects the laser light reflected from the target and generates lidar point cloud data of the target. The memory stores 3-D models of possible targets. The processor, for each of the 3-D models, maps the 3-D model into a spatial coordinate system of the lidar point cloud data, calculates a fit error between the lidar point cloud data and the 3-D model, and repetitively shifts the lidar point cloud data as a group in the spatial coordinate system and re-calculates the fit error until a minimum fit error for the 3-D model is identified. The processor identifies the 3-D model having the least fit error, and identifies the target based on the 3-D model having the least fit error.

In an embodiment of the flash lidar system, the receiver comprises a planar array of Geiger-mode avalanche photodiodes (APDs) that detects the laser light reflected from the target and generates the lidar point cloud data of the target.

In an embodiment of the flash lidar system, the target comprises an aircraft.

In an embodiment of the flash lidar system, the processor scales the 3-D model in the spatial coordinate system of the lidar point cloud data based on a range to the target.

In an embodiment of the flash lidar system, the processor orients the 3-D model in the spatial coordinate system of the lidar point cloud data based on a velocity vector of the target.

In an embodiment of the flash lidar system, the processor performs integer shifts of the lidar point cloud data in the spatial coordinate system that are based on quantized spatial characteristics of the lidar point cloud data.

In an embodiment of the flash lidar system, the processor utilizes a Root Mean Square goodness-of-fit to calculate the fit error.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

As discussed previously, jitter generated in lidar point cloud data represents an underlying error in the data which, if mitigated, can improve various processes such as target recognition. Generally, lidar point cloud data generated from a single laser pulse or a short group of pulses is well correlated in jitter, which allows the lidar point cloud data to be de-jittered as a group. In the embodiments described herein, lidar point cloud data generated from an unknown target is shifted as a group in its spatial coordinate system, while a goodness-of-fit is performed between the shifted data and 3-D models of possible targets. The 3-D model that generates the best fit for the shifted lidar point cloud data represents the target being imaged.

Generally, the 3-D models of possible targets are mapped into the spatial coordinate system of the point cloud data based on a number of factors, including the range to the unknown target and the detected orientation of the unknown target. For example, a velocity vector of an unknown jet aircraft provides orientation information for how different 3-D models of possible targets might be mapped into the spatial coordinate system of the point cloud data, as it is not possible for most jet aircraft to fly backwards. In another example, the scale of the 3-D model as represented in the spatial coordinate system of the point cloud data is based on the detected range to the unknown aircraft.

While determining the goodness-of-fit of the shifted point cloud data to the 3-D models may be performed in a number of different ways, some exemplary processes described herein include repetitively calculating a Root Mean Square (RMS) goodness-of-fit metric while shifting the point cloud data, repetitively calculating a Residual Sum of Squares (RSS) goodness-of-fit metric, and repetitively calculating an ABSolute value (ABS) goodness-of-fit metric. However, as many other types of data fitting methods exist in statistical analysis that determine how well a model fits data, the application of the present disclosure applies to any other type of data fitting method that may be used to determine a goodness-of-fit of the lidar point cloud data and the 3-D models described herein.

Figure 1:
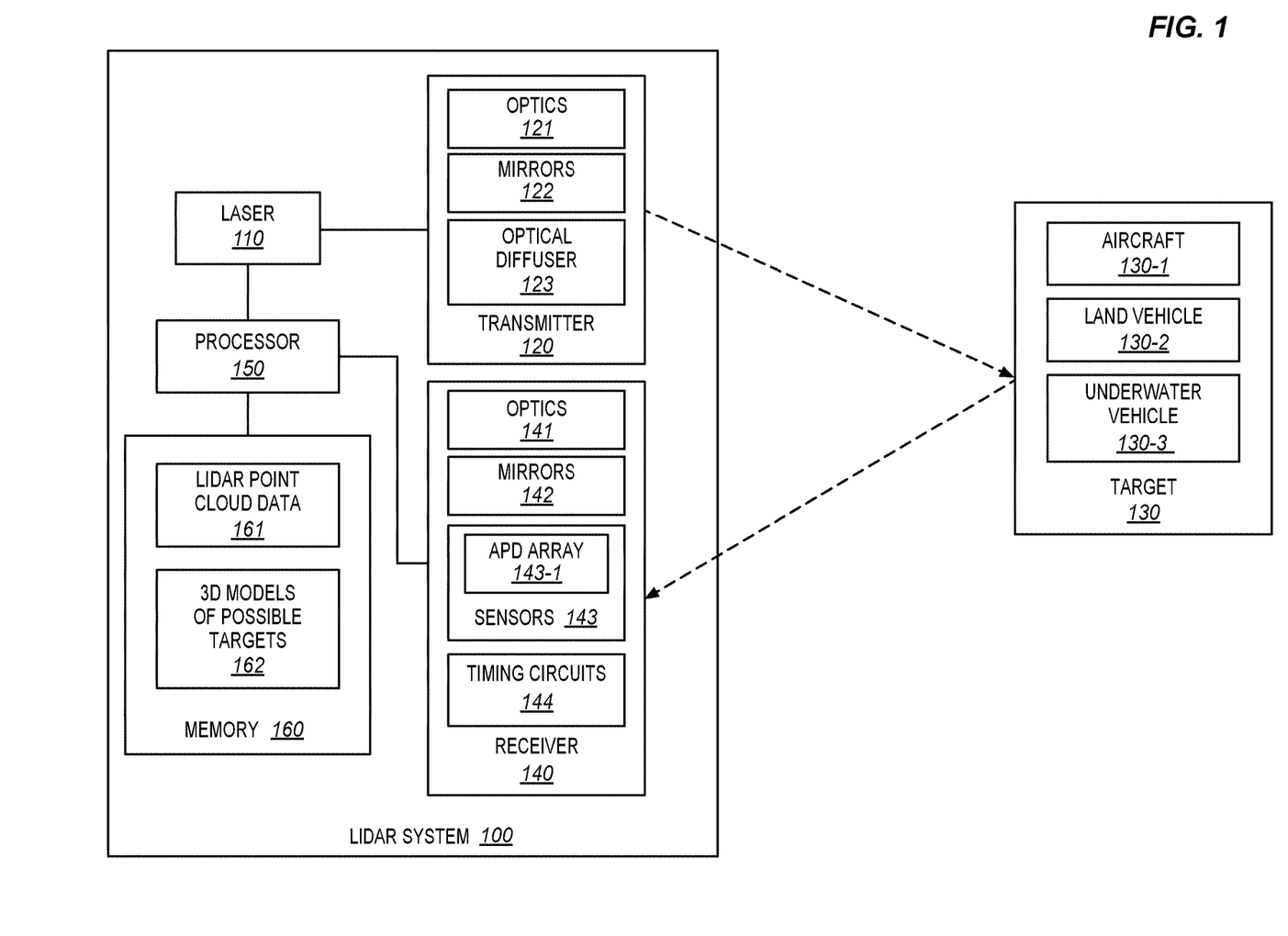
FIG. 1 depicts a lidar system in an illustrative embodiment.

FIG. 1 is a block diagram of a lidar system 100 in an illustrative embodiment. In this embodiment, lidar system 100 includes a laser 110 comprising any component, system, or device that generates pulsed laser light, and a transmitter 120 that illuminates a target 130 with one or more pulses of the laser light generated by laser 110. Laser 110 may generate pulsed laser light within different frequency ranges depending on the application. For example, 1550 nanometer laser light is eye-safe at relatively high-power levels, because this wavelength is not strongly absorbed by the eye. 1550 nm laser light is also not visible in night vision goggles, unlike the shorter 1000 nm infrared frequencies. Typical airborne applications use 1064 nm frequencies, while underwater applications use 532 nm frequencies that penetrate water with less attenuation than 1064 nm frequencies. In one embodiment, target 130 comprises an aircraft 130-1, although in other embodiments, target 130 comprises a land vehicle 130-2 or an underwater vehicle 130-3.

Transmitter 120 comprises any component, system, or device that propagates the pulsed laser light to illuminate target 130. For example, transmitter 120 may include various optics 121, mirrors 122, optical diffusers 123, etc., which enable lidar system 100 to illuminate target 130 with pulsed laser light. A receiver 140 of lidar system 100 comprises any component, system, or device that receives pulsed laser light reflected from target 130. Receiver 140 may include optics 141, mirrors 142, sensors 143, timing circuits 144, etc., which detects the reflected pulsed laser light from target 130, and provides timing information for the photons received by receiver 140. The sensors of receiver 140 may include various types of photon sensors as a matter of design choice. In some embodiments, receiver 140 includes multiple photon sensors arranged in a planar array, with each pixel sensor in the array configured to individually sense photons reflected from target 130 and generate timing information that is used to determine the range between lidar system 100 and target 130. In one such embodiment, the array of photon sensors utilizes Geiger-mode avalanche photodiodes (APDs), which are fast sensing devices capable of sensing a single photon. An APD array 143-1 generates quantized spatial data based on the distance between the pixels in the APD array 143-1, along with quantized spatial data in range that is based on the pulse rate of laser 110 and/or the dead time of the APDs between detecting successive photons.

A processor 150 of lidar system 100 is coupled to a memory 160. Processor 150 comprises any component, system, or device that interfaces with receiver 140 and generates point cloud data 161, which is stored by memory 160. Memory 160 also stores 3-D models 162, which represent different models of possible targets that may be detected by lidar system 100.

Point cloud data 161 is a collection of data points that represent the 3-D shape of the portion of target 130 illuminated by lidar system 100. Point cloud data 161 is derived based on the angle-angle-range data calculated by lidar system 100 for backscatter photons received from target 130.

Processor 150 includes any hardware device that is able to perform functions. Processor 150 may include one or more Central Processing Units (CPU), microprocessors, Digital Signal Processors (DSPs), Application-specific Integrated Circuits (ASICs), etc. Some examples of processors include INTEL® CORE™ processors, Advanced Reduced Instruction Set Computing (RISC) Machines (ARM®) processors, etc.

Memory 160 includes any hardware device that is able to store data, including point cloud data 161 and 3-D models 162. Memory 160 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

Figure 2:
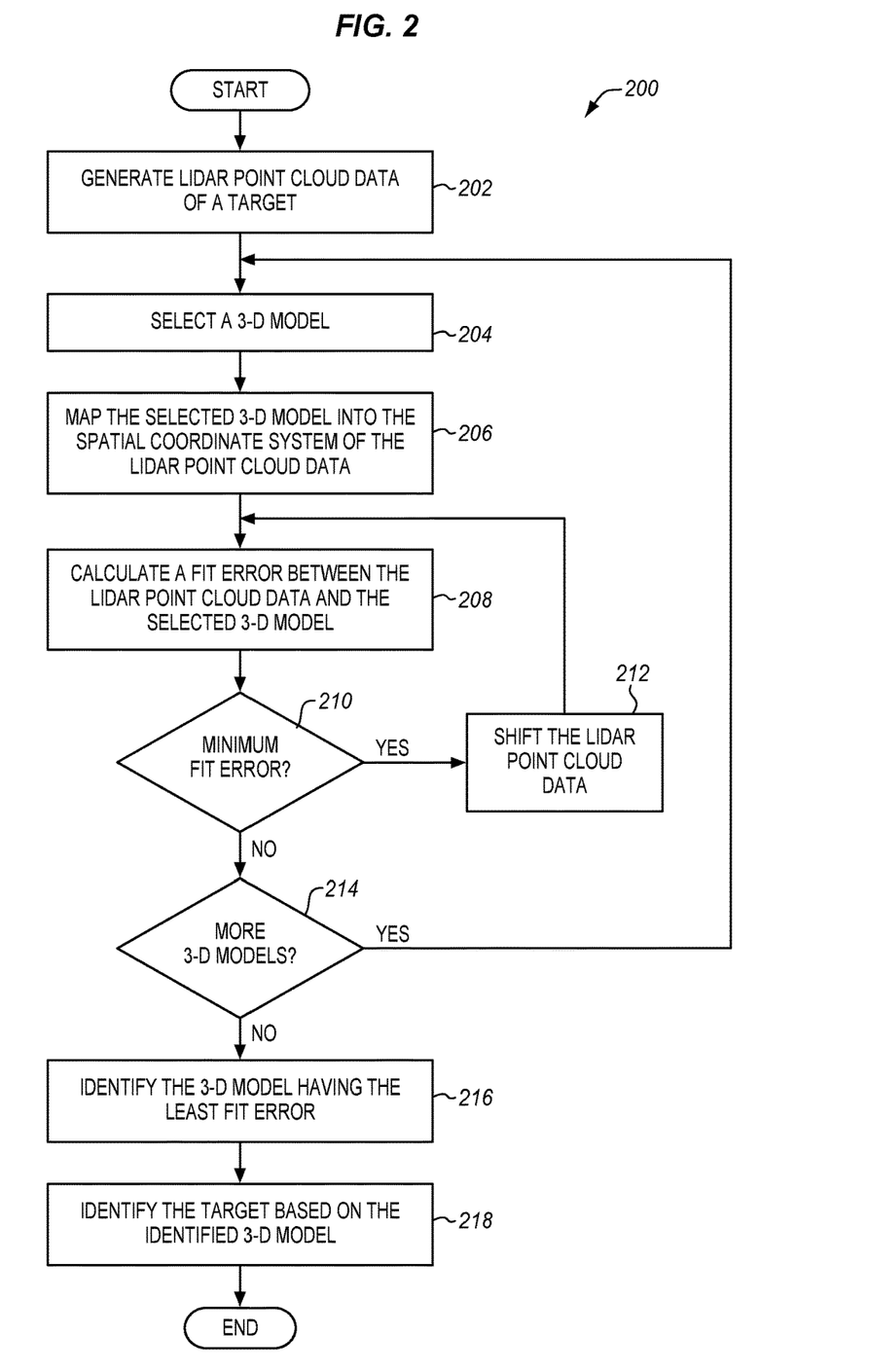
FIG. 2 is a flow chart of a method of identifying a target using 3-D data models to de-jitter lidar point cloud data in an illustrative embodiment.

FIG. 2 is a flow chart of a method 200 of identifying an unknown target using 3-D data models to de-jitter lidar point cloud data in an illustrative embodiment. Method 200 will be described with respect to lidar system 100, although method 200 may apply to other systems, not shown. Method 200 may include other steps, not shown, and the steps may be performed in an alternate order.

Laser 110 generates one or more pulses of laser light, which is applied by transmitter 120 to illuminate target 130. For instance, transmitter 120 receives the one or more pulses of laser light from laser 110, and using optical diffuser 123, generates an expanding 3-D field of laser light that illuminates target 130. Target 130, now illuminated by the laser light, reflects a portion of the laser light pulses, which are received by receiver 140. Lidar system 100 then generates point cloud data 161 for target 130 based on the photons generated by laser 110 that are received from target 130 (see step 202). For example, receiver 140 may utilize APD array 143-1, which comprises APD devices organized in rows and columns, which receives photons from target 130 as target 130 is illuminated by lidar system 100.

Processor 150 selects one of the 3-D models 162 of possible targets for analysis (see step 204). In some embodiments, processor 150 filters out some 3-D models 162 for analysis based on different factors, such as the geographic location of lidar system 100, the velocity vector of target 130 (if moving), an approximate size of target 130, etc. For instance, some of 3-D models 162 may be filtered out if they are unlikely to be found at the geographic location of lidar system 100. In another example, some 3-D models 162 may be filtered out if the velocity vector of target 130 exceeds the known capability of some vehicles represented by 3-D models 162. In yet another example, some 3-D models 162 may be filtered out if the size of target 130 (based on point cloud data 161 and the measured range of target 130) does not correspond well with a size of the vehicles represented by the 3-D models.

Processor 150 maps the selected 3-D model 116 into a spatial coordinate system of point cloud data 161 (see step 206). Processor 150 calculates a fit error between point cloud data 161 and the selected 3-D model 116 (see step 208). Calculating a fit error can be performed in a number of different ways as a matter of design choice. Generally, an analysis is performed between data points in point cloud data 161 and data points on the surface of the selected 3-D model 116 to determine how well the point cloud data 161 matches the selected 3-D model 116.

In response to calculating the fit error, processor 150 determines if the minimum fit error has been found for the selected 3-D model 116. Since this is the first time evaluating the selected model 116 on this pass through method 200, a number of fit error calculations are made by shifting the point cloud data 161 around in its spatial coordinate system (see step 212) and re-calculating the fit error for the shifted data (see step 208). Generally, the number of shifts is finite, and the amount and direction of shifts in the spatial coordinate system of point cloud data 161 are based on the expected jitter in lidar system 100. Typically, the jitter in range to target 130 is low, while the jitter in other dimensions is higher. This type of information may be used to constrain the direction and number of shifts for point cloud data 161 when evaluating how well the shifted data fits to the selected 3-D model 116.

In some embodiments, the shifts are quantized based on how point cloud data 161 is generated. For example, APD array 143-1 is quantized along its planar surface based on the distance between individual sensors (e.g., an x-y axis) while a range to target 130 is quantized in range (e.g., z-axis) due to the minimum quench time of an APD sensor.

If the minimum fit error for the selected 3-D model 116 has been determined (e.g., additional shifts in point cloud data 161 do not result in a smaller fit error for this model), then processor 150 determines if additional 3-D models 162 remain for analysis (see step 214). If additional 3-D models 162 remain for analysis, then processing returns to select another 3-D model 116 (see step 204).

In response to analyzing how shifts in point cloud data 161 generate a goodness-of-fit to different 3-D models 162, processor 150 identifies one of 3-D models 162 that has the least fit error (see step 216). The least fit error corresponds to the 3-D model 116 that is the best goodness-of-fit to point cloud data 161. Processor 150 identifies target 130 based on the identified 3-D model 116 (see step 218). Using method 200, point cloud data 161 is de-jittered as a group by fitting the lidar data to various 3-D models 162, and determining which of the 3-D models 162 achieves the best goodness-of-fit. This allows lidar system 100 to mitigate the jitter in point cloud data 161. Mitigating jitter in point cloud data 161 has the technical benefit of allowing lidar system 100 to more accurately identify target 130.

Figure 3:
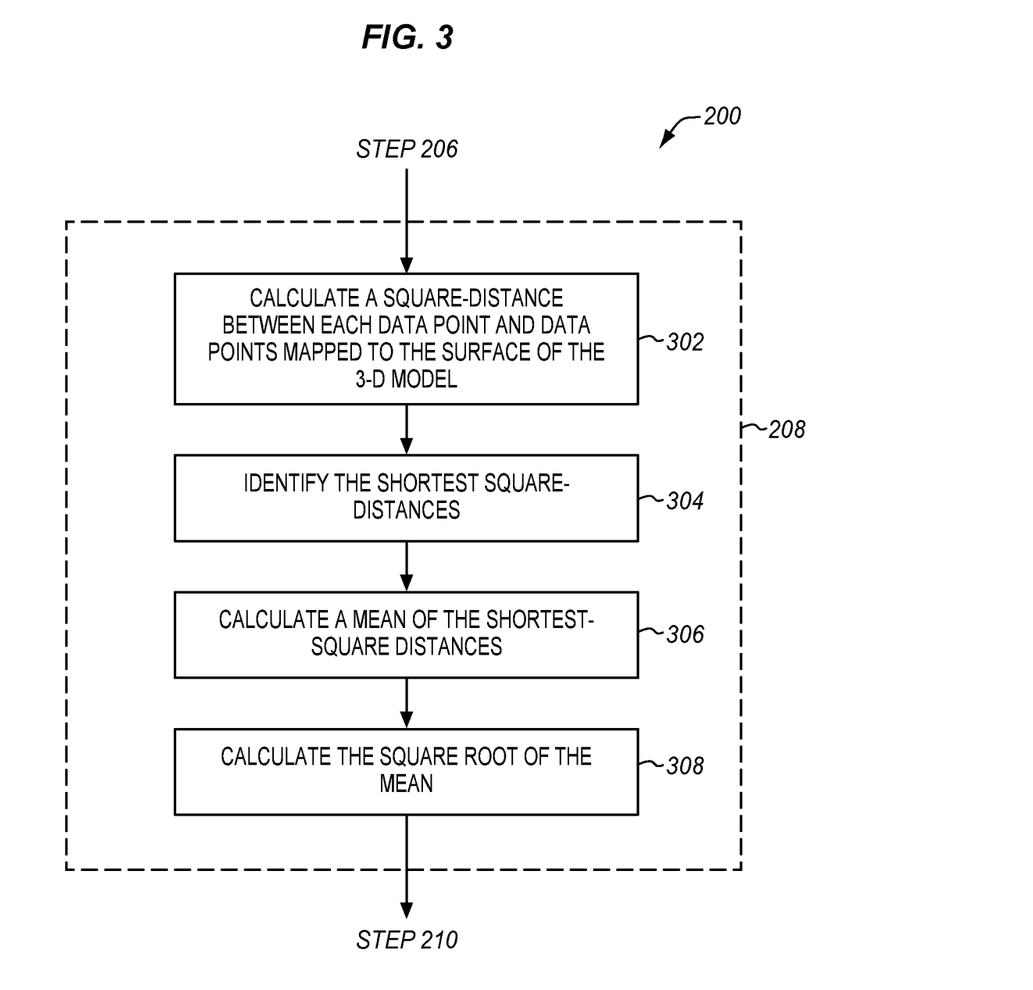
FIG. 3 depicts additional steps of the method of FIG. 2 used to calculate a Root Mean Square (RMS) goodness-of-fit in an illustrative embodiment.

FIG. 3 depicts additional steps of method 200 in an illustrative embodiment. In this embodiment, calculating the fit error between point cloud data 161 and the selected 3-D model 116 is performed using an RMS goodness-of-fit calculation. Processor 150 calculates square-distances between each data point in point cloud data 161 and data points mapped to the surface of the selected 3-D model 116 (see step 302 of FIG. 3), and processor 150 identifies the shortest square-distances for each data point in point cloud data 161 (see step 304 of FIG. 3).

Figure 4:
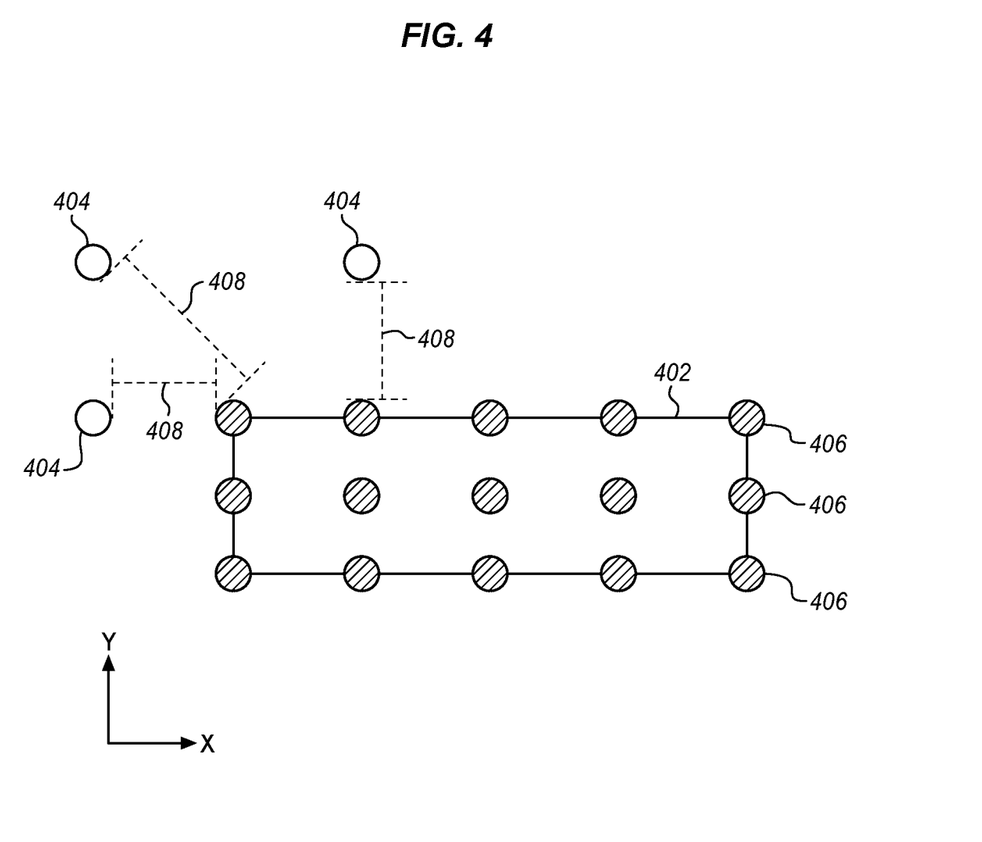
FIG. 4 depicts a 2-D representation of data points in point cloud data and how they may be evaluated with respect to a 2-D model.

FIG. 4 depicts a 2-D representation of data points in point cloud data 161 and how they may be evaluated with respect to a 2-D model 402. While FIG. 4 describes the fit process with respect to two dimensions (x, y), the process can also be applied to a 3-D spatial coordinate system. Thus, the depiction of the 2-D spatial coordinate system in FIG. 4 is merely for simplifying the following discussion.

In FIG. 4, lidar data 404 is 2-D point cloud, and data points 406 are mapped to the surface of 2-D model 402. The shortest square distances 408 calculated between each point of lidar data 404 and data points 406 mapped to 2-D model 412 are illustrated, for the particular spatial configuration of lidar data 404.

When applying an RMS goodness-of-fit metric, a mean of the shortest-square distances 408 are calculated (see step 306, FIG. 3), and the square root of the mean is calculated (see step 308). The square root of the mean represents the RMS goodness-of-fit metric for 2-D model 402. In order to identify the minimum fit error (as described in step 210 of method 200), lidar data 404 is shifted in the example x-y spatial coordinate system and steps 302-308 are repeated.

Figure 5:
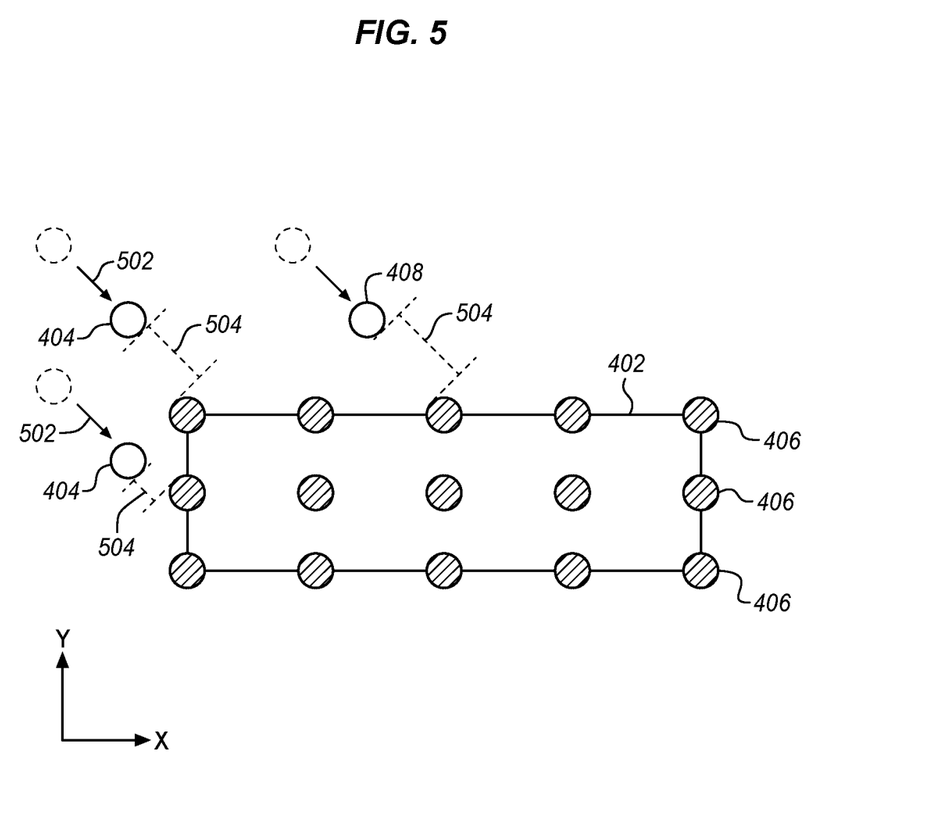
FIG. 5 depicts the result of shifting lidar data in an illustrative embodiment.

FIG. 5 depicts the result of shifting lidar data 404 in an illustrative embodiment. In this embodiment, lidar data 404 is shifted in the direction of arrows 502, with new shortest square distances 504 as the result of the shift. The result of the shift illustrated in FIG. 5 results in a lower RMS fit error between lidar data 404 and data points 406 on 2-D model 402. In this embodiment, lidar data 404 is shifted as a group as jitter in lidar data 404 is well correlated when single laser pulses or short successive groups of laser pulses are used to image target 130.

Figure 6:
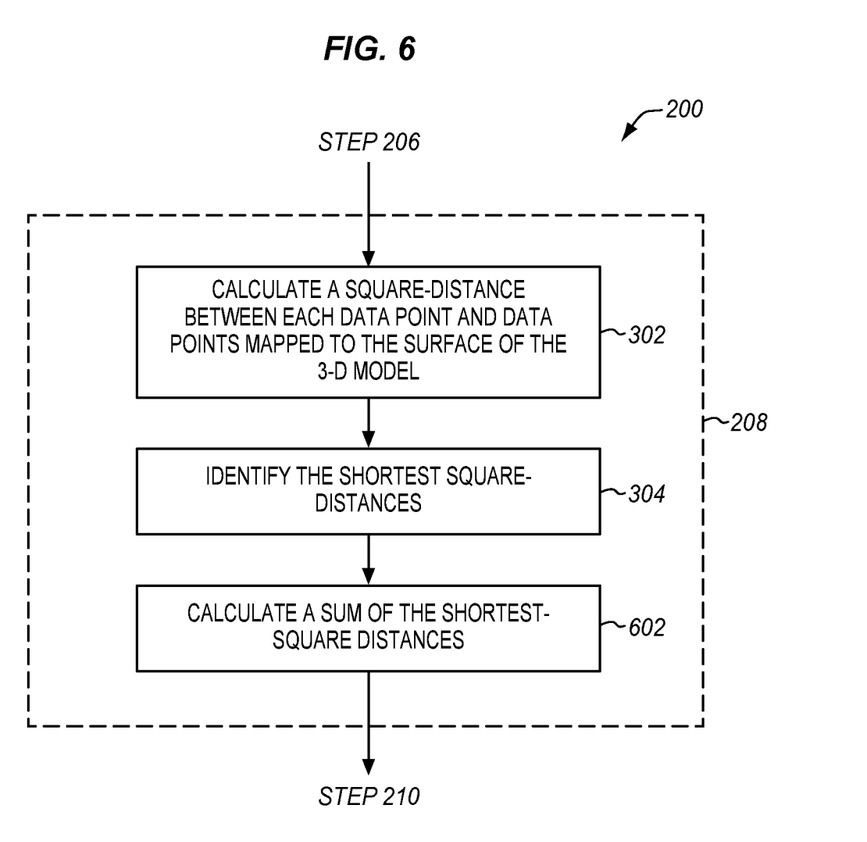
FIG. 6 depicts additional steps of the method of FIG. 2 to calculate a Residual Sum of Squares (RSS) goodness-of-fit in an illustrative embodiment.

FIG. 6 depicts additional steps of method 200 in an illustrative embodiment. In this embodiment, calculating the fit error between point cloud data 161 and the selected 3-D model 116 is performed using an RSS goodness-of-fit calculation. Processor 150 calculates square-distances between each data point in point cloud data 161 and data points mapped to the surface of the selected 3-D model (see step 302 of FIG. 6), and identifies the shortest square-distances for each data point in point cloud data 161 (see step 304 of FIG. 6). Using the shortest square-distances 408 (see FIG. 4), processor 150 calculates a sum of shortest square-distances 408 (see step 602 of FIG. 6). The sum represents the RSS goodness-of-fit metric for 2-D model 402. In order to identify the minimum fit error (as described in step 210 of method 200), lidar data 404 is shifted in the example x-y spatial coordinate system and steps 302, 304, and 602 of FIG. 6 are repeated. FIG. 5 depicts the result of shifting lidar data 404 in the direction of arrows 502, with new shortest square distances 504 as the result of the shift. The shift illustrated in FIG. 5 results in a lower RSS fit error between lidar data 404 and data points 406 on 2-D model 402.

Figure 7:
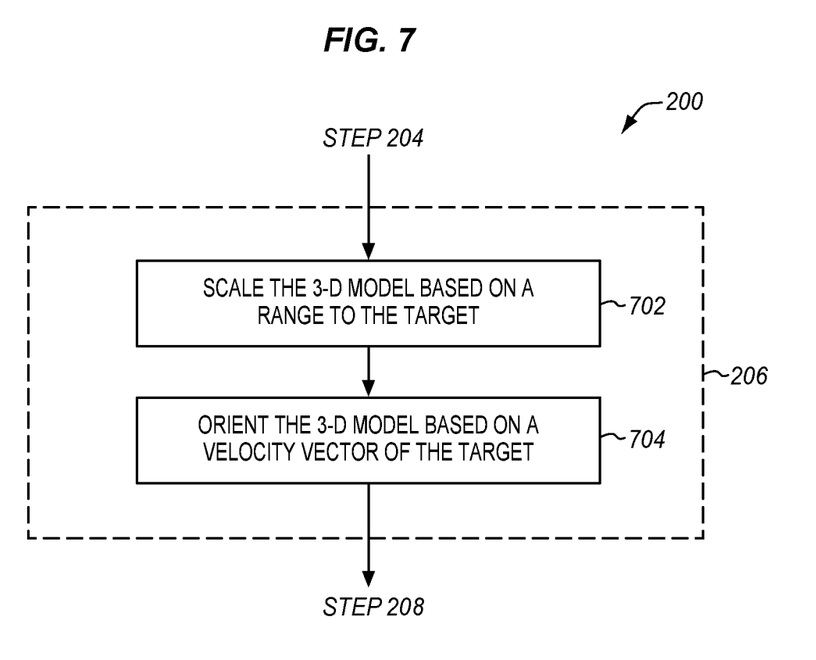
FIG. 7 depicts additional steps of the method of FIG. 2 to map a 3-D model into a spatial coordinate system of the lidar point cloud data.

FIG. 7 depicts additional steps of method 200 in an illustrative embodiment. In this embodiment, mapping the selected 3-D model 116 includes scaling the selected 3-D model 116 in the spatial coordinate system of point cloud data 161 based on range information to target 130 (see step 702). In addition to or instead of, mapping the selected 3-D model 116 includes orienting the selected 3-D model 116 based on a velocity vector of target 130 (see step 704).

Although a target recognition process has been described, other applications exist that may benefit from de-jittering lidar point cloud data. For example, if the imaged target is known, then fitting the lidar data to a model of the target allows for the jitter in lidar system 100 to be determined, which can be used to bound the number of shifts and the spatial direction of the shifts that may be implemented to determine a fit to a model of an unknown target.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A method comprising:
    (a) generating lidar point cloud data of a target;
    (b) selecting a 3-D model from a plurality of 3-D models of possible targets stored in memory;

(c) mapping the selected 3-D model into a spatial coordinate system of the lidar point cloud data;
(d) calculating a fit error between the lidar point cloud data and the selected 3-D model;
(e) repetitively shifting the lidar point cloud data as a group in the spatial coordinate system and re-calculating the fit error until a minimum fit error for the selected 3-D model is identified;
(f) repeating steps b-e for each of the 3-D models;
(g) identifying the 3-D model having the least fit error; and
(h) identifying the target based on the 3-D model having the least fit error.

2. The method of claim 1, wherein:
(a) generating lidar point cloud data comprises generating flash lidar point cloud data.

3. The method of claim 1, wherein:
the target comprises an aircraft.

4. The method of claim 1, wherein:
(c) mapping the selected 3-D model comprises scaling the 3-D model in the spatial coordinate system of the lidar point cloud data based on a range of the target.

5. The method of claim 1, wherein:
(c) mapping the selected 3-D model comprises orienting the 3-D model in the spatial coordinate system of the lidar point cloud data based on a velocity vector of the target.

6. The method of claim 1, wherein:
(e) repetitively shifting the lidar point cloud data comprises integer shifts in the spatial coordinate system that are based on quantized spatial characteristics of the lidar point cloud data.

7. The method of claim 1, wherein:
(d) calculating a fit error between the lidar point cloud data and the selected 3-D model comprises calculating a Root Mean Square goodness-of-fit.

8. A method, comprising:
storing a plurality of 3-D models of possible targets in memory;
generating point cloud data of an unidentified target by ranging the unidentified target with a flash ranging device;
for each 3-D model of the plurality of 3-D models, performing the steps of:
  mapping the 3-D model into a spatial coordinate system of the point cloud data;
  calculating a fit error between the point cloud data and the 3-D model; and
  repetitively shifting the point cloud data as a group in the spatial coordinate system and re-calculating the fit error until a minimum fit error for the 3-D model is identified;
identifying the 3-D model having the least fit error; and
identifying the unidentified target based on the 3-D model having the least fit error.

9. The method of claim 8, wherein:
the flash ranging device comprises flash lidar.

10. The method of claim 8, wherein:
the unidentified target comprises an aircraft.

11. The method of claim 8, wherein:
mapping the 3-D model comprises scaling the 3-D model in the spatial coordinate system of the point cloud data based on a range to the unidentified target.

12. The method of claim 8, wherein:
mapping the 3-D model comprises orienting the 3-D model in the spatial coordinate system of the point cloud data based on a velocity vector of the unidentified target.

13. The method of claim 8, wherein:
repetitively shifting the point cloud data comprises integer shifts in the spatial coordinate system that are based on a quantized spatial characteristic of the point cloud data.

14. The method of claim 8, wherein:
calculating the fit error between the point cloud data and the 3-D model comprises calculating a Root Mean Square goodness-of-fit.

15. A flash lidar system, comprising:
a laser configured to generate laser light;
a transmitter configured to illuminate a target with one or more pulses of the laser light;
a receiver configured to detect the laser light reflected from the target and to generate lidar point cloud data of the target;
a memory configured to store a plurality of 3-D models of possible targets; and
a processor configured, for each 3-D model of the 3-D models, to map the 3-D model into a spatial coordinate system of the lidar point cloud data, to calculate a fit error between the lidar point cloud data and the 3-D model, and to repetitively shift the lidar point cloud data as a group in the spatial coordinate system and re-calculate the fit error until a minimum fit error for the 3-D model is identified,
wherein the processor is further configured to identify the 3-D model having the least fit error, and to identify the target based on the 3-D model having the least fit error.

16. The flash lidar system of claim 15, wherein:
the receiver comprises a planar array of Geiger-mode avalanche photodiodes (APDs) that are configured to detect the laser light reflected from the target and to generate lidar point cloud data of the target.

17. The flash lidar system of claim 15, wherein:
the target comprises an aircraft.

18. The flash lidar system of claim 15, wherein:
the processor is further configured to scale the 3-D model in the spatial coordinate system of the lidar point cloud data based on a range to the target.

19. The flash lidar system of claim 15, wherein:
the processor is further configured to orient the 3-D model in the spatial coordinate system of the lidar point cloud data based on a velocity vector of the target.

20. The flash lidar system of claim 15, wherein:
the processor is further configured to perform integer shifts of the lidar point cloud data in the spatial coordinate system that are based on quantized spatial characteristics of the lidar point cloud data.

21. The flash lidar system of claim 15, wherein:
the processor is further configured to utilize a Root Mean Square goodness-of-fit to calculate the fit error.

* * * * *